W. A. WARMAN.
SLIDE RULE.
APPLICATION FILED DEC. 22, 1914.

1,279,798.

Patented Sept. 24, 1918.
4 SHEETS—SHEET 1.

Witnesses:
A. V. Walsh
George E. Cook.

Inventor:
William A. Warman
by George Cook

W. A. WARMAN.
SLIDE RULE.
APPLICATION FILED DEC. 22, 1914.

1,279,798.

Patented Sept. 24, 1918.
4 SHEETS—SHEET 2.

Witnesses:

Inventor:
William A. Warman
By George Cook

W. A. WARMAN.
SLIDE RULE.
APPLICATION FILED DEC. 22, 1914.
1,279,798.
Patented Sept. 24, 1918.
4 SHEETS—SHEET 4.
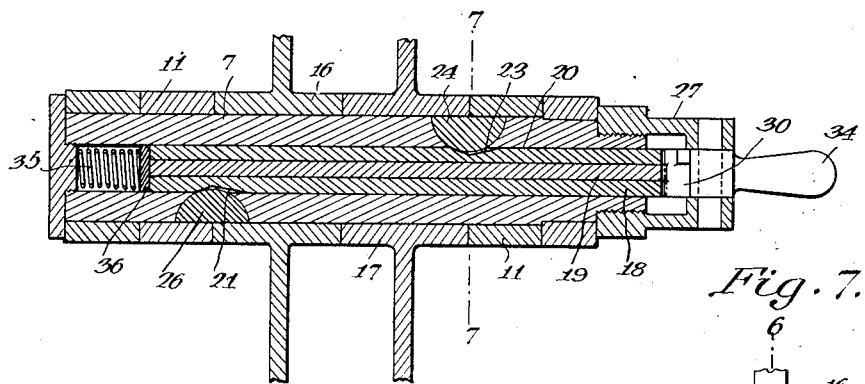
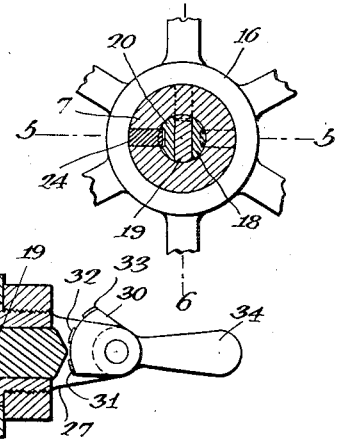
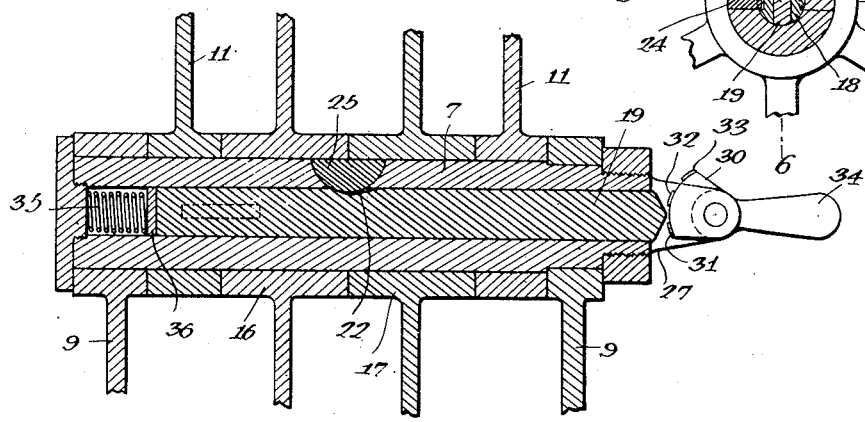
Witnesses:
Inventor:
William A. Warman

UNITED STATES PATENT OFFICE.

WILLIAM A. WARMAN, OF NEW YORK, N. Y., ASSIGNOR TO KELLER MECHANICAL ENGRAVING COMPANY, OF NEW YORK, N. Y., A CORPORATION OF NEW YORK.

SLIDE-RULE.

1,279,798.   Specification of Letters Patent.   Patented Sept. 24, 1918.

Application filed December 22, 1914. Serial No. 878,491.

*To all whom it may concern:*

Be it known that I, WILLIAM A. WARMAN, a citizen of the United States, and a resident of New York, borough of Manhattan, in the county of New York and State of New York, have made and invented certain new and useful Improvements in Slide-Rules, of which the following is a specification.

My invention relates to calculating machines or implements of the circular slide rule type in which operations involving multiplication and division are performed by adding or subtracting logarithms by means of scales divided logarithmically and movable relative to one another; and comprises a slide rule device having scales carried by members movable relatively to one another about a common axis, and which scales are so divided and graduated that problems involving hours and fractional parts of an hour may be performed directly, and without first reducing the fractional parts to their decimal equivalents as is necessary in using a slide rule the scales of which are graduated decimally, the numerals associated with the points of division of a scale of my improved slide rule indicating numbers and fractional parts (not decimal) thereof, instead of numbers and decimal parts thereof as is commonly the case in slide rules.

A further object of my invention is to provide in combination with the logarithmic scales of the device, certain scales divided and graduated in equal parts for the purpose of adding time intervals to thus determine the total time consumed upon a particular operation, the time thus determined to be then used as a factor in multiplication or division operations to be performed by the logarithmic scales of the device.

A further object of my invention is to provide a circular slide rule having certain locking mechanism for holding the several members which constitute the same in proper definite relations with one another after they have been adjusted preparatory to using the rule.

My improved calculating machine or circular slide rule is designed particularly for use in computing pay rolls in manufacturing establishments wherein the numerous workmen commonly work for various times measured in hours and fractional parts thereof (commonly 12ths as 5 minute intervals are the shortest taken account of), at rates based upon various rates per week, the number of hours of which again vary in different establishments. It also follows that the cost of the labor expended upon a given manufactured product is determinable in the same way.

With the above and other objects of invention in view, my invention consists in the circular slide rule device illustrated in the accompanying drawings and hereinafter described and claimed, and in such variations and modifications thereof as will be obvious to those skilled in the art to which my invention relates.

In the drawings wherein the preferred embodiment of my invention is illustrated:

Fig. 5 is a view drawn to a larger scale and showing certain locking or clamping mechanism forming a part of my device, this view being taken upon a longitudinal plane indicated by the line 5—5, Fig. 7;

Fig. 6 is a similar view but taken upon a plane indicated by the line 6—6, Fig. 7; and Fig. 7 is a view taken upon a transverse plane indicated by the line 7—7, Fig. 5.

Figure 1:
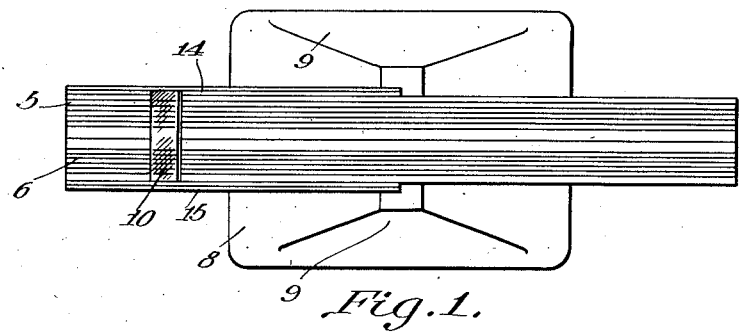
Figure 1 is a view showing my improved circular slide rule in plan.
Figure 2:
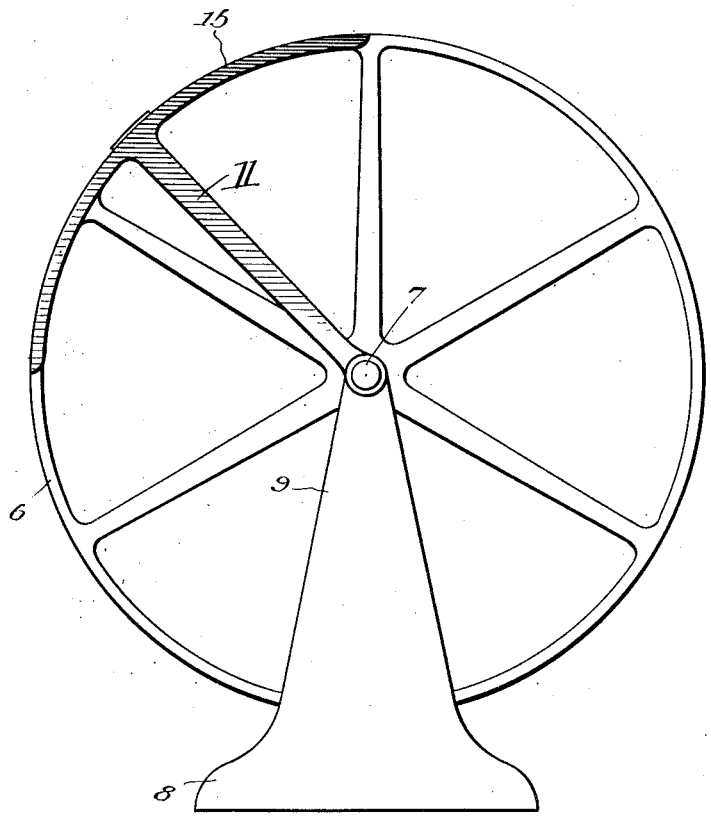
Fig. 2 is a view showing the same in side elevation.

In the drawings the reference characters 5, 6 designate two wheels adjustable about an axle 7 and upon the peripheries of which wheels the various scales used in performing mathematical problems by the rule are engraved or otherwise placed, although it will be understood that my invention is equally applicable and includes slide rule devices in which the various scales are impressed upon circular disks, as distinguished from on the peripheries of wheels. The wheels are supported from a suitable base 8 by means of pedestals 9, and are both rotatable upon an axis 7, so that they may be moved independently of one another in setting the scales, and together in bringing the divisions of the scales into a position to be read conveniently.

Figure 3:
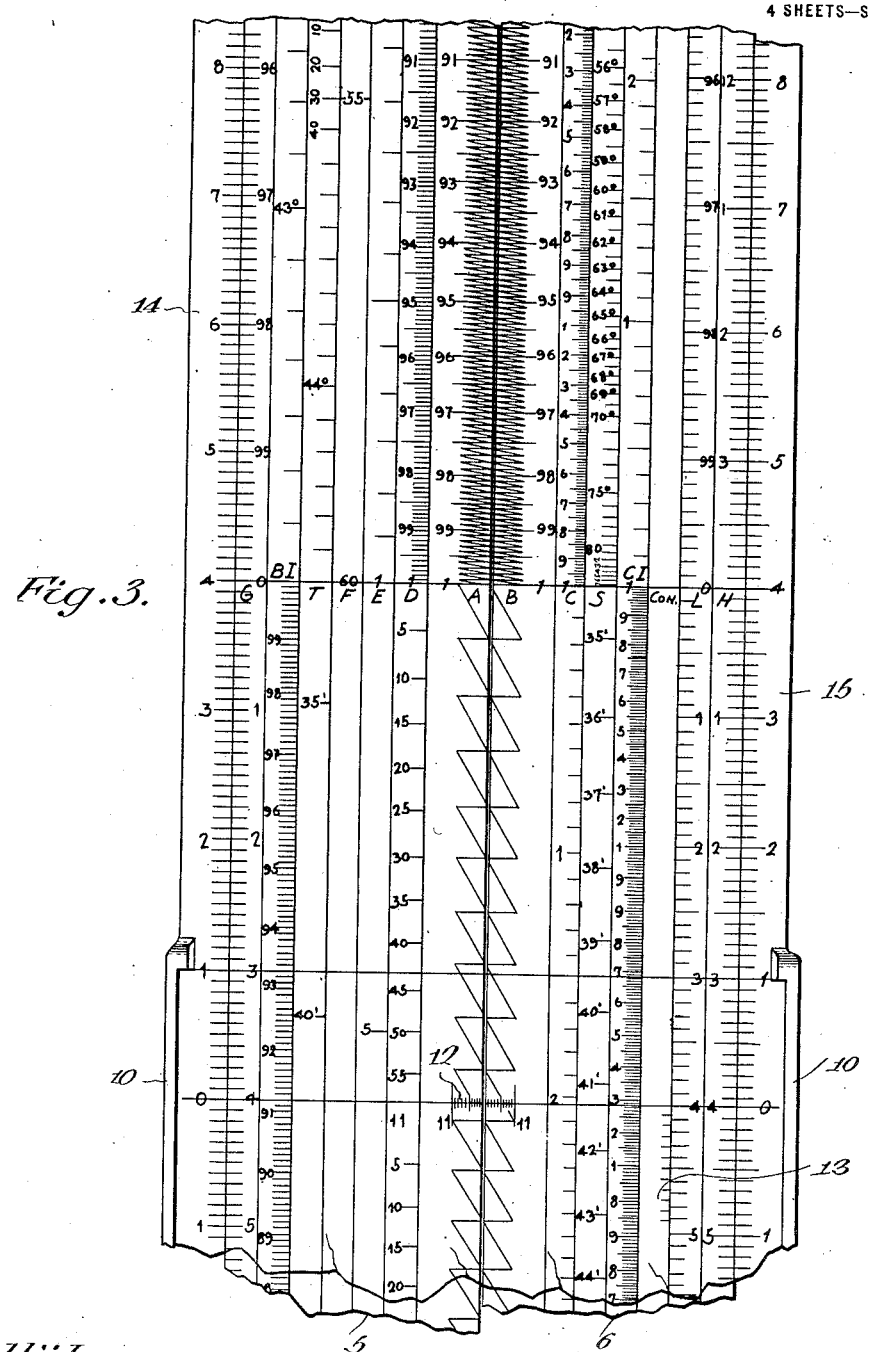
Fig. 3 is a view showing a portion of the peripheries of the wheels upon which various scales are impressed, and illlustrating also the way in which the scales are divided and graduated or marked.

The reference character 10 designates a runner supported from the axle 7 by means of arms 11 and extending across the faces of the wheels as shown in Figs. 1 and 3, the runner commonly having a transparent window through which the scales may be seen, and a line engraved thereupon for use in setting the scales and in reading results from them. The transparent portion of the runner has a vernier 12, Fig. 3, engraved upon it and divided logarithmically for use in reading numerical quantities to four figures as will be hereinafter explained, and also a second vernier 13 for use in reading one of the scales.

The runner may be moved about the axle relative to the wheels as will be understood, and the same carries two graduated scales 14, 15, the use of which will be hereinafter explained.

The various scales upon the wheels 5, 6, and the manner in which they are sub-divided, graduated, and arranged, is as follows:

The scales A and B extend throughout the entire circumference of the wheels and are ordinary logarithmic scales each sub-divided into 100 parts and graduated from 1 to 100, the distance from the beginning of the scales to the several points of division being proportionate to the logarithms of the numbers placed at the points of division, as is always the case in scales divided logarithmically. These scales obviously read to three figures directly, and to four figures by the use of the vernier 12 above referred to in connection with the diagonal lines connecting the several successive points of division. They are obviously the equivalent of the C and D scales of an ordinary slide rule, and may be used to solve problems involving multiplication, division and proportion in the same manner as with an ordinary slide rule, the result being read directly to three figures, or to four figures by using the vernier.

Adjacent the scale A on the wheel 5 are three scales D, E and F each extending throughout the entire circumference of the wheel and which scales are referred to as "hour scales" for the reason that while each is sub-divided logarithmically in the same manner as the scales A and B (although E and F need not be so finely sub-divided as A), the numerals placed at the various points of division represent hours and five minute intervals, the spaces thus representing units and twelfths thereof, instead of units and tenths as in a logarithmic scale as it is ordinarily graduated. Thus the scale F is sub-divided into twelve parts, each representing five minutes, and the entire scale representing one hour. The scale E is graduated from one to ten hours, each division representing five minutes, while the scale D is graduated from ten to one hundred hours, the major sub-divisions being sub-divided each into twelve parts and graduated to read intervals of five minutes each. Any interval from five minutes to one hundred hours varying by intervals of five minutes may therefore be read upon one or another of the three scales in question. From the foregoing it follows that any given quantity of time in hours and minutes read from the figures upon the hour scales is reduced to hours and tenths of an hour, or to tenths of an hour; and that it is not necessary to reduce the five minute intervals or twelfths of an hour in which time is commonly measured to decimal equivalents or to tenths, as a step preliminary to multiplying the time by a rate per hour measured in dollars or cents, that is decimally, by means of the scale B.

It is therefore possible to perform such operations as involve costs or wages based upon any number of hours and fractions thereof of time at a given rate per hour, day, or week directly by the rule, and without first reducing the five minute intervals in which the time is reckoned to decimal equivalents of an hour. This is best done by employing the method of proportion as used in slide rule practice, as follows, assuming 54 hours as constituting a week's work, and a rate of $24.00 per week. In such a case, by setting 54 on the scale D opposite 24 on the scale B, the costs or wages corresponding with any given number of hours or five minute intervals thereof read on either the scales D, E or F (which is obviously a known quantity), may be read directly from the scale B, the proportion being expressed as follows: 54: 24: time: X.

As thus set, and without changing the relative position of the wheels, we will find opposite five minutes on the scale F, 3700 on the scale B; and opposite 30 minutes on F, 2220 on B. Reading time on the scale E we will find 1333 on the scale B opposite three hours; and reading time on the scale D we will find 2244 on B opposite 50 hours and 30 minutes. These quantities are obviously read as significant figures and without reference to their actual values, as is always the case in using a slide rule. They represent, however, in dollars and cents, $.037, $.222, $1.333, and $22.44, these being obviously the costs of or wages for 5 minutes, 30 minutes, 3 hours, and 50 hours 30 minutes time or work at a rate of $24.00 per week of 54 hours. The cross line on the runner will obviously be used in setting the scales, and in reading from one scale to another, as in an ordinary slide rule; and the product or result will be read decimally upon the scale B notwithstanding the fact that the time on the hour scales is read thereon in hours and twelfths.

A further use of the scales D, E and F is in multiplying or dividing time read upon said scales by an abstract multiplier or divisor, the process being identical with like processes performed by the use of the decimally graduated scales of an ordinary slide rule, the result, however, being read from the hour scales in hours and minutes, instead of decimally as is the case in slide rule practice. Thus, for multiplication, the index point or 1 of B is set opposite any known time (multiplicand) indicated upon the scales D, E or F; then opposite the multiplier on the scale B the product is read upon the hour scales directly in hours and minutes.

In performing examples in division, the divisor on the scale B is set opposite the dividend indicated in hours and minutes upon the scales D, E or F; and the quotient read in hours and minutes upon the hour scales opposite 1 on the scale B; the dividend and quotient being read in hours and minutes, as distinguished from in hours and decimal parts or hundredths thereof, as in ordinary operations with a slide rule.

It will also be obvious that the scales B and the hour scales may be used in solving problems involving feet and inches (or twelfths) and without first reducing the inches to decimal equivalents of a foot, the result or answer being read on the hour scales directly in feet and inches.

The scale T is a logarithmic scale of tangents, and the scale B I corresponds with the scale B but is reversed or inverted with reference thereto. The use of these scales is the same as with an ordinary slide rule and further reference to them is unnecessary as they are not involved in the invention to which this application relates.

The scale C upon the wheel 6 is a logarithmic scale graduated from 1 to 100 and extending throughout one-half the circumference of the wheel, so that the combined length of two such scales corresponds with the length of the scale B. The scale C is similar to the double A scale of an ordinary Mannheim rule, and is used in connection with the scale B in finding the square or the square root of numbers in the same manner as with an ordinary slide rule. The arrangement of this scale adjacent the scale B, however, permits problems involving the square or square root of numbers to be more readily solved than with an ordinary slide rule in which the slide is located between the scales used in such operations, as the result may be read without using the runner, whereas in the ordinary slide rule the runner must be used because the slide lies between the two scales used.

The scale S is a logarithmic scale of sines; C I is a scale corresponding with the scale C, but inverted or reversed; and L is a scale extending throughout the circumference of the wheel and sub-divided decimally, this scale being used to read the logarithms of numbers corresponding with numbers on the scale B, the same as the scale of equal parts on an ordinary slide rule. The vernier 13 upon the runner adjacent this scale above referred to enables logarithms to be read to four figures. The scales referred to in this paragraph are ordinary slide rule scales, and are not involved in the invention disclosed in this application.

Located at the left-hand edge of the wheel 5 is a scale G extending throughout the circumference of the wheel and divided into 100 main divisions and graduated accordingly, each major division being sub-divided into 12 parts to indicate 5 minute intervals, the major divisions indicating hours. The right-hand edge of the wheel 6 is divided and sub-divided in the same way to provide a scale H, but the points of division are graduated from 1 to 12, designating hours and five minute intervals, and the graduations repeated, 8 and ⅓ such short or 12 hour scales occurring in succession and collectively forming the scale H.

The scales G and H are used to add several time intervals to determine the entire time worked by a workman during a day or week, or to determine the total time devoted to a particular piece of work, in the same way as ordinary addition scales. For instance, if three hours 15 minutes is to be added to four hours 35 minutes, any numeral 12 upon the scale H (which corresponds with the zero points of the several successive scales which make up the scale H) is placed opposite 4 hours 35 minutes upon the scale G, and, opposite 3 hours 15 minutes upon H, we read the result, 7 hours 50 minutes upon G. The runner may then be set to this value on G, and an additional time interval added to the amount on G by again setting 12 on the scale H to the runner, that is, to 7 hours 50 minutes, and, opposite the time to be added read on H, the new sum may be read on G. Any number of time intervals may thus be accumulated on G, and the result used as a factor in multiplying by means of the hour scales and the scale B, as above pointed out. During this addition process it will be obvious that any one of the several 1 to 12 scales which make up the scale H may be used to measure the increment to be added to the amount already accumulated upon the scale G.

Another use of the scales G and H is to determine the time interval between two clock times. For example, to find the time interval between 8:15 A. M. and 5:45 P. M., we set any scale division indicating 8 hours and 15 minutes upon the scale H opposite the zero point on the scale G, and read the result (9 hours 30 minutes) on G, opposite the scale division indicating 5 hours 45 minutes on the next succeeding 1 to 12 section of the scale H.

The scales 14, 15 carried by the runner 10 are for the purpose of subtracting from a given interval of time an intervening interval of lost time, as time taken for lunch; or for deducting time during which a workman is not working upon a given piece of work. This may be done by first finding the total time as above, disregarding the time to be deducted, and then reading back along the scale 14 from the total time indicated on G, the time to be deducted. The zero points of the scales 14, 15 correspond with the reading line on the runner, so that the act of reading from H to G automatically sets the zero point of the scale 14 at the division on G indicating the total time interval from which the lost time is to be deducted.

The same end may be accomplished by in effect using the scales H and 15 as additional scales, as will be understood by the following example: Required to find the total time worked during the day by a workman between the hours of 7 and 11 A. M. and 12 and 5 P. M. We set 7 on the scale H opposite zero on the scale G, then set 2 on the scale 15 opposite 11 on the scale H, and read the result (7 hours) on the scale G opposite 5 on the scale 15, it being noted that the 2 selected on the scale 15 should be the one beyond the zero point of the scale, as otherwise the interval to be deducted would in fact be added to the interval between the two extreme clock times.

Figure 4:
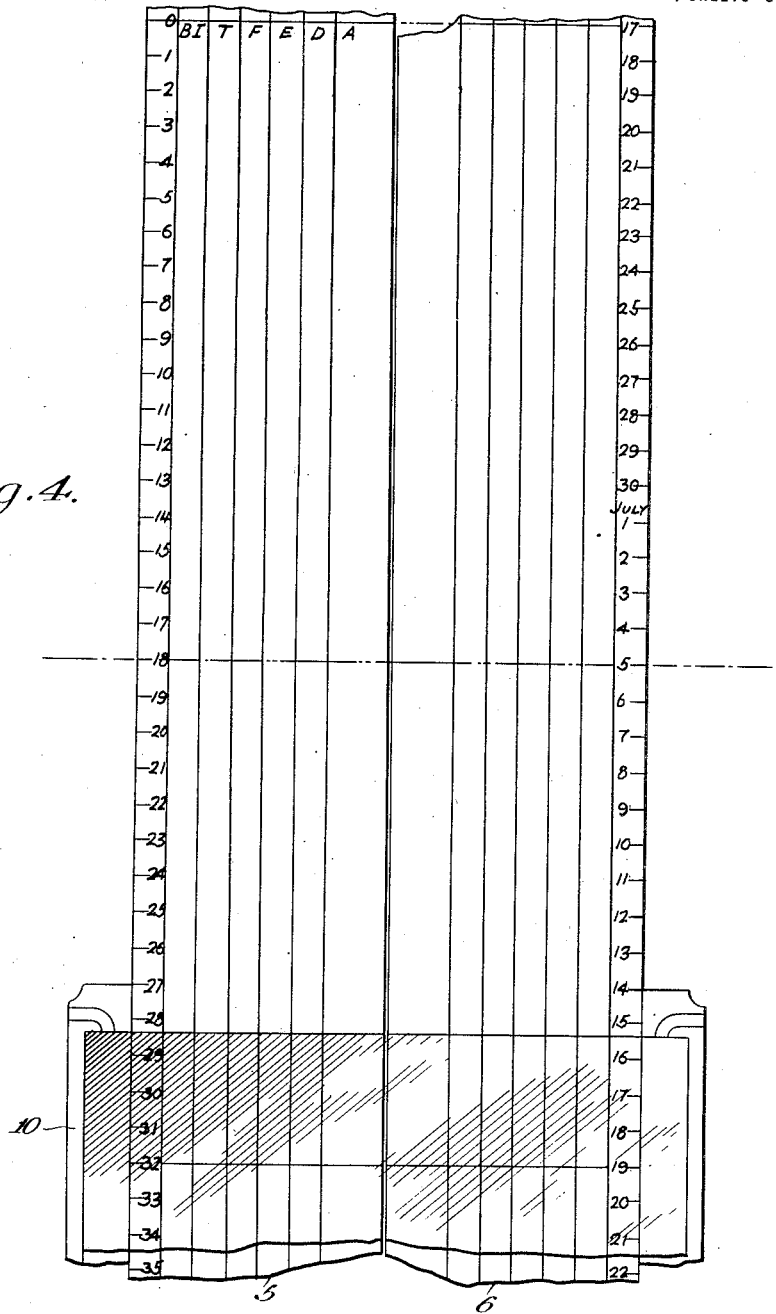
Fig. 4 is a similar view illustrating a modified system of graduation for two of the scales.

Fig. 4 shows a form of my circular slide rule provided with two scales useful in computing interest. The intermediate scales are the same as the scales hereinbefore described, and are not shown in detail. The left-hand edge of the wheel 5, however, is provided with a scale divided into 360 equal parts in place of the scale G, and the right-hand edge of the wheel 6 is likewise divided into 360 parts arranged in 12 successive scales of 30 divisions each. Months are engraved between the several successive scales, so that the right-hand scale represents 12 months of 30 days each as is assumed in practice in interest computations, while the left-hand scale represents a year of 360 days as used in figuring interest. If, then, any given day of any month read on the right-hand scale be set opposite zero of the left-hand scale, then opposite any successive date on the right-hand scale the number of days between the two dates may be read from the left-hand scale. The days thus determined will then obviously be used as a factor in multiplication processes performed by means of the scales A and B, to determine interest due.

Figs. 5, 6 and 7 show certain clamping or locking mechanism for locking or clamping the runner and either of the wheels 5, 6, to the axle 7 leaving the other wheel free to be rotated thereupon or for clamping both the wheels to the axle leaving the runner free to move relative to the wheels. In these figures the reference characters 16, 17 designate the hubs of the wheels 5, 6; and 18, 19, 20 designate three sliding members or bars located within a passage extending longitudinally of the axle 7. These bars are provided with inclined cam surfaces as shown at 21, 22, 23, which engage keys 24, 25, 26 located in recesses in the axle 7 and force them outward against the inner surfaces of the hubs of the wheels and runner arms 11 when the bars are moved longitudinally within the passage in the axle. A yoke 27 is secured to one end of the axle 7 which yoke supports an oscillating operating member 30 having three projections 31, 32, 33 adapted to engage the ends of the bars 18, 19, 20 and move them toward the left, to thereby operate the keys 24, 25, 26, the particular key operated depending upon which one of the bars is operated. It therefore follows that by a proper manipulation of the operating member 30 by means of the handle 34 the runner and either one of the wheels may be locked to the axle by means of one of the keys, 24, 26; and that both wheels may be locked to the axle by means of the key 25. A spring 35 is provided for forcing the bars toward the right, the end of which bears against a disk 36, which disk rests against the left-hand ends of the bars.

It will of course be understood that the axle 7 is rotatable in the bearings provided for it at the upper ends of the pedestals or supports 9, so that after the runner and either wheel are clamped or locked to the axle, or after the two wheels are clamped to the axle, the parts thus clamped or locked together, together with the axle, may be rotated to bring the scales into a position such that they may be read with convenience.

Having thus described and explained my invention, I claim and desire to secure by Letters Patent:

1. In a device of the class described, a rotatable axle having a passage extending longitudinally thereof; means for supporting said axle; two wheels supported by said axle and rotatable thereupon, and the peripheries of which wheels carry scales for performing mathematical calculations; a movable runner supported from said axle and extending across the peripheries of said wheels; and means located within the passage aforesaid for locking said runner and either one of said wheels to said axle, and for locking both said wheels to said axle.

2. In a device of the class described, a rotatable axle having a passage extending longitudinally thereof; means for supporting said axle; two wheels supported by said axle and rotatable thereupon, the peripheries of which wheels carry scales for performing mathematical calculations; a movable runner supported from said axle and extending across the peripheries of said wheels; three reciprocating members located within the passage aforesaid and having each an inclined cam surface; means for moving said reciprocating members; and three keys located in recesses formed in said axle and in engagement one with each of said cam surfaces and which keys extend to the periphery of said axle.

3. In a device of the class described, a rotatable axle having a passage extending longitudinally thereof; means for supporting said axle; two wheels supported by said axle and rotatable thereupon, and the peripheries of which wheels carry scales for performing mathematical calculations; a movable runner supported from said axle and extending across the peripheries of said wheels; three reciprocating members located within the passage aforesaid and having each an inclined cam surface; three keys located in recesses formed in said axle and in engagement one with each of said cam surfaces and which keys extend to the periphery of said axle; and an oscillating operating member carried by said axle and having projections adapted to engage and operate said reciprocating members.

4. A slide rule mechanism comprising a rotatably mounted axle, two wheels arranged side by side rotatably mounted thereon, hubs spaced to the sides of said wheels and rotatably mounted upon said axle, a runner extending across the periphery of said wheels and secured to said spaced hubs and carried thereby, means housed within said axle adapted to lock together said wheels and said runner-carrying hubs.

5. A calculating instrument of the class described comprising two wheels arranged adjacent to one another, the periphery of one of said wheels having a logarithmically divided scale graduated to read in integers and decimal fractional parts thereof, and a second scale divided into equal parts and graduated to read in hours and minutes; and the periphery of the adjacent wheel having a logarithmic scale graduated to read in hours and minutes, and a second scale divided into equal parts and graduated to read in hours and minutes.

6. A calculating instrument of the class described comprising two members movable relative to each other, and each of which carries a logarithmically-divided scale, which scales are of equal length; the scale upon one of said members being graduated to read in units and tenths thereof, or decimally; and the scale upon the other of said members being graduated so as to read in units and twelfths thereof.

Signed at New York, borough of Manhattan, in the county of New York and State of New York, this 17" day of December, A. D. 1914.

WILLIAM A. WARMAN.

Witnesses:
 ANNA V. WALSH,
 GEORGE E. COOK.